United States Patent
Watanabe et al.

(10) Patent No.: US 9,404,503 B2
(45) Date of Patent: Aug. 2, 2016

(54) COMPRESSOR MOTOR AND ELECTRIC COMPRESSOR INCLUDING THE SAME

(75) Inventors: Takayuki Watanabe, Tokyo (JP); Masashi Kuroko, Aichi (JP); Kazutaka Nakamura, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 525 days.

(21) Appl. No.: 13/817,252

(22) PCT Filed: Dec. 19, 2011

(86) PCT No.: PCT/JP2011/079345
§ 371 (c)(1),
(2), (4) Date: Feb. 15, 2013

(87) PCT Pub. No.: WO2012/093579
PCT Pub. Date: Jul. 12, 2012

(65) Prior Publication Data
US 2013/0142682 A1    Jun. 6, 2013

(30) Foreign Application Priority Data
Jan. 7, 2011 (JP) ................................ 2011-002055

(51) Int. Cl.
*F04D 25/06*    (2006.01)
*H02K 5/22*    (2006.01)
(Continued)

(52) U.S. Cl.
CPC .......... *F04D 25/0606* (2013.01); *F01C 21/007* (2013.01); *F01C 21/10* (2013.01); *F04B 39/121* (2013.01); *F04C 23/008* (2013.01); *F04C 29/0085* (2013.01); *H02K 5/225* (2013.01); *F04C 18/0207* (2013.01); *F04C 2240/30* (2013.01); *F04C 2240/40* (2013.01); *F04C 2240/803* (2013.01)

(58) Field of Classification Search
CPC ...... F01C 21/007; F01C 21/10; F04B 39/121; F04C 18/0207; F04C 2240/30; F04C 2240/40; F04C 23/008; F04C 29/0085; F04D 25/0606; H02K 5/225

USPC ............................................ 310/71; 417/423.7
See application file for complete search history.

(56) References Cited

U.S. PATENT DOCUMENTS

| | | | |
|---|---|---|---|
| 2006/0119197 A1* | 6/2006 | Puterbaugh | H02K 5/10 310/87 |
| 2010/0028175 A1* | 2/2010 | Ichise et al. | 417/410.5 |

(Continued)

FOREIGN PATENT DOCUMENTS

| | | | |
|---|---|---|---|
| CN | 101666303 A | 3/2010 | |
| EP | 2159425 A2 * | 3/2010 | F04C 23/00 |

(Continued)

OTHER PUBLICATIONS

Japanese Decision to Grant a Patent dated Nov. 18, 2014, issued in corresponding JP application No. 2011-002055 (3 pages). Explanation of Relevance—"The Decision to Grant a Patent has been received."

(Continued)

*Primary Examiner* — Alex W Mok
(74) *Attorney, Agent, or Firm* — Westerman, Hattori, Daniels & Adrian, LLP

(57) ABSTRACT

Provided is a compressor motor that can achieve reduction in length of a motor lead wire, compactification of a motor housing, and reduction in size and weight of an electric compressor, and also provided is an electric compressor including the compressor motor. A cluster block (39) that is connected to a stator coil end of a motor (10) via a motor lead wire is placed in an outer circumferential region of a stator coil end cover (38) or a bobbin (37A) of the motor (10) such that a terminal connection port of the cluster block (39) faces an outer circumferential side. An opening (34) and a placement bearing surface (35) for inserting and placing a hermetic terminal (8) are provided in an outer circumferential region of a motor housing (4), the outer circumferential region facing the cluster block (39) provided on the motor (10) side. The hermetic terminal (8) is inserted and placed from an outer circumferential side of the motor housing (4) to the opening (34) and the placement bearing surface (35), to be thereby made directly connectable to the terminal connection port of the cluster block (39).

10 Claims, 7 Drawing Sheets

(51) Int. Cl.
*F04B 39/12* (2006.01)
*F04C 29/00* (2006.01)
*F01C 21/00* (2006.01)
*F01C 21/10* (2006.01)
*F04C 23/00* (2006.01)
*F04C 18/02* (2006.01)

(56) References Cited

U.S. PATENT DOCUMENTS

| | | | |
|---|---|---|---|
| 2010/0111709 A1* | 5/2010 | Jayanth | F04C 23/008 417/44.11 |
| 2010/0181877 A1* | 7/2010 | Watanabe et al. | 310/68 D |
| 2011/0020153 A1* | 1/2011 | Murakami | 417/410.1 |
| 2011/0158833 A1* | 6/2011 | Murakami | F04B 35/04 417/422 |

FOREIGN PATENT DOCUMENTS

| | | |
|---|---|---|
| JP | 2-136579 A | 5/1990 |
| JP | 2002-98054 A | 4/2002 |
| JP | 2004-176682 A | 6/2004 |
| JP | 2006-42409 A | 2/2006 |
| JP | 2010-59809 A | 3/2010 |

OTHER PUBLICATIONS

International Search Report for PCT/JP2011/079345, mailing date of Mar. 13, 2012.
Written Opinion of the International Searching Authority for PCT/JP2011/079345, mailing date of Mar. 13, 2012.
Chinese Office Action dated Mar. 2, 2015, issued in corresponding CN Patent Application No. 201180040305.X with English translation (17 pages).

\* cited by examiner

COMPRESSOR MOTOR AND ELECTRIC COMPRESSOR INCLUDING THE SAME

TECHNICAL FIELD

The present invention relates to a compressor motor that is placed in a housing and receives electric power applied from the outside via a hermetic terminal and to an electric compressor including the compressor motor.

BACKGROUND ART

In an electric compressor, a compressor motor for driving a compression mechanism is built in a housing having a sealed structure, together with the compression mechanism. Electric power is supplied to the compressor motor from the outside through an inverter via a hermetic terminal that is placed so as to pass completely through the housing. That is, the hermetic terminal that passes completely through the housing is placed, and Faston terminals of lead wires taken out from a motor coil end are connected to the hermetic terminal, whereby an external power supply is electrically connected to the compressor motor built in the housing having the sealed structure, thus enabling the supply of electric power.

In this case, the respective Faston terminals provided to the three UVW lead wires need to be fitted and fixed for connection to the hermetic terminal in an extremely small space, and hence the assembling workability is low. In addition, because an extra working space needs to be secured, the outer shape of the housing, eventually, the outer shape of the electric compressor becomes larger. In order to improve such a problem in connectivity of motor lead wires deriving from Faston terminals, PTL 1 discloses that a hermetic terminal and a motor harness (lead wires) are electrically connected to each other using a cluster block including UVW terminals integrated in a resin case.

CITATION LIST

Patent Literature

{PTL 1}
Japanese Unexamined Patent Application, Publication No. 2010-59809

SUMMARY OF INVENTION

Technical Problem

Unfortunately, PTL 1 adopts a structure in which: the motor harness taken out from a stator coil is connected to the cluster block fixedly placed in the outer circumferential region of a motor stator, on a compression mechanism side of a stator coil end of a motor; and the hermetic terminal that is placed so as to pass completely through a housing bottom part is inserted and connected to the cluster block, on the opposite side of the stator coil end. With this configuration, a space for arranging the cluster block and the motor harness needs to be formed over the entire length of the motor stator, on the outer circumference of the housing that accommodates the motor. Hence, reduction in size and weight of the housing cannot necessarily be achieved, and the length of the motor harness unfavorably increases.

The present invention, which has been made in view of the above-mentioned circumstances, has an object to provide a compressor motor that can achieve reduction in length of a motor lead wire, compactification of a motor housing, and reduction in size and weight of an electric compressor, and an electric compressor including the compressor motor.

Solution to Problem

In order to solve the above-mentioned problems, a compressor motor and an electric compressor including the same according to the present invention adopt the following solutions.

That is, a compressor motor according to a first aspect of the present invention is placed in a motor housing and receives electric power applied from an outside via a hermetic terminal. In the compressor motor, a cluster block that is connected to a stator coil end of the motor via a motor lead wire is placed in an outer circumferential region of a stator coil end cover or a bobbin of the motor such that a terminal connection port of the cluster block faces an outer circumferential side, an opening and a placement bearing surface for inserting and placing the hermetic terminal are provided in an outer circumferential region of the motor housing, the outer circumferential region facing the cluster block provided on the motor side, and the hermetic terminal is inserted and placed from an outer circumferential side of the motor housing to the opening and the placement bearing surface, to be thereby made directly connectable to the terminal connection port of the cluster block.

According to the first aspect, the cluster block that is connected to the stator coil end of the motor via the motor lead wire is placed in the outer circumferential region of the stator coil end cover or the bobbin of the motor such that the terminal connection port of the cluster block faces the outer circumferential side, the opening and the placement bearing surface are provided in the outer circumferential region of the motor housing, the outer circumferential region facing the cluster block, and the hermetic terminal is inserted and placed from the outer circumferential side of the motor housing to the opening and the placement bearing surface, to be thereby made directly connectable to the terminal connection port of the cluster block. Accordingly, in the state where the motor in which the cluster block connected to the motor lead wire is placed in the outer circumferential region of the stator coil end cover or the bobbin is inserted and placed at a predetermined position of the motor housing, the hermetic terminal is inserted and connected directly to the terminal connection port of the cluster block from the outer circumferential side of the motor housing through the opening, and the hermetic terminal is fixedly placed on the placement bearing surface of the motor housing, whereby electrical connection from the outside of the motor housing to the motor in the motor housing can be established. Such a configuration eliminates the need to connect the motor lead wire and the hermetic terminal to each other in a small space in the motor housing. Hence, the assembling of the motor can be facilitated, and the length of the motor lead wire can be reduced. Further, the compressor motor does not require: securing a connection space for the motor lead wire on the stator coil end side of the motor; and securing an arrangement space for the cluster block, the motor lead wire, and the like over the entire length of the motor housing, and eventually reduction in size and weight of the housing and the electric compressor can be achieved.

Moreover, in the compressor motor according to the first aspect, the cluster block may be placed so as to be slightly displaceable in a circumferential direction and/or an axial direction with respect to the stator coil end cover or the bobbin.

According to the first aspect, the cluster block is placed so as to be slightly displaceable in the circumferential direction and/or the axial direction with respect to the stator coil end cover or the bobbin. Hence, such slight displacement of the cluster block can absorb a tolerance at the time of the attachment of the hermetic terminal. Accordingly, the hermetic terminal can be easily inserted and connected to the cluster block from the outside of the motor housing, and the assembling of the motor can be facilitated.

Moreover, in the compressor motor according to the first aspect, the cluster block may be slightly displaceably locked by respectively fitting a plurality of nail parts erected from the outer circumferential region of the stator coil end cover or the bobbin, to attachment holes with a slight gap in the circumferential direction and/or the axial direction.

According to the first aspect, the cluster block is slightly displaceably locked by respectively fitting the plurality of nail parts erected from the outer circumferential region of the stator coil end cover or the bobbin, to attachment holes with the slight gap in the circumferential direction and/or the axial direction. Hence, the cluster block is fitted to the plurality of nail parts erected from the stator coil end cover or the bobbin, through the attachment holes with the gap, whereby the cluster block can be easily slightly displaceably locked. Accordingly, the attachment of the cluster block to the motor and the assembling of the motor can be facilitated.

Moreover, in the compressor motor according to the first aspect, the cluster block may have an inner circumferential surface in contact with the outer circumferential region of the stator coil end cover or the bobbin, the inner circumferential surface having a shape along an outer circumferential surface of the stator coil end cover or the bobbin.

According to the first aspect, the cluster block has the inner circumferential surface in contact with the outer circumferential region of the stator coil end cover or the bobbin, the inner circumferential surface having the shape along the outer circumferential surface of the stator coil end cover or the bobbin. Hence, the inner circumferential surface of the cluster block is placed along the outer circumferential surface of the stator coil end cover or the bobbin, whereby the cluster block can be stably placed in the outer circumferential region of the stator coil end cover or the bobbin. Accordingly, the insertion and connection of the hermetic terminal to the cluster block can be facilitated.

Moreover, in the compressor motor according to the first aspect, the cluster block may have a stepped structure in which a terminal in a central portion of UVW terminals is arranged higher than terminals on both sides thereof, and the inner circumferential surface of the cluster block may have the shape along the outer circumferential surface of the stator coil end cover or the bobbin.

According to the first aspect, the cluster block has the stepped structure in which the terminal in the central portion of the UVW terminals is arranged higher than the terminals on both the sides thereof, and the inner circumferential surface of the cluster block has the shape along the outer circumferential surface of the stator coil end cover or the bobbin. Hence, the inner circumferential surface of the cluster block having the stepped structure is placed along the outer circumferential surface of the stator coil end cover or the bobbin, whereby the cluster block can be stably placed. Accordingly, the insertion and connection of the hermetic terminal to the cluster block can be facilitated. Further, the outer circumferential surface of the cluster block also has a stepped shape along the inner circumferential surface of the motor housing, and hence the diameter of the motor housing can also be reduced, thus achieving reduction in size thereof.

Moreover, in the compressor motor according to the first aspect, the cluster block may include a guide part that is integrally provided thereto and guides the motor lead wire.

According to the first aspect, the cluster block includes the guide part that is integrally provided thereto and guides the motor lead wire. Hence, the motor lead wire can be connected to the cluster block by means of the guide part integrally provided to the cluster block. This can suppress protrusion of the motor lead wire and contact thereof with other components. Accordingly, troubles caused by such protrusion of the motor lead wire and contact thereof with the other components can be prevented, and the reliability of the compressor motor can be enhanced.

Moreover, in the compressor motor according to the first aspect, the motor housing may include an inverter accommodating part that is provided in an outer circumferential region thereof corresponding to a position at which the hermetic terminal is placed, and electric power controlled by an inverter placed in the inverter accommodating part may be applied to the motor via the hermetic terminal.

According to the first aspect, the motor housing includes the inverter accommodating part that is provided in the outer circumferential region thereof corresponding to the position at which the hermetic terminal is placed, and the electric power controlled by the inverter placed therein is applied to the motor via the hermetic terminal. Hence, the UVW terminals of the inverter provided in the inverter accommodating part and the hermetic terminal are electrically connected to each other, and the electric power controlled by the inverter incorporated in the motor housing is applied to the motor via the hermetic terminal, whereby the motor can be driven. Accordingly, the connection between the motor provided inside of the motor housing and the inverter provided outside thereof can be simplified and facilitated, and the assembling of the compressor motor for inverter driving can be facilitated.

Moreover, an electric compressor according to a second aspect of the present invention includes a compression mechanism and a compressor motor that are respectively built in housings, the compressor motor driving the compression mechanism. In the electric compressor, the compressor housing having the compression mechanism built therein is integrally joined to the motor housing, and the compression mechanism is coupled to the compressor motor having any of the above-mentioned features that is built in the motor housing, to be thereby made drivable by means of the compressor motor.

According to the second aspect, the electric compressor includes the compression mechanism and the compressor motor that are respectively built in the housings. In the electric compressor, the compressor housing having the compression mechanism built therein is integrally joined to the motor housing, and the compression mechanism is coupled to the compressor motor having any of the above-mentioned features that is built in the motor housing, to be thereby made drivable by means of the compressor motor. Hence, the compression mechanism coupled to the compressor motor can be driven by means of the compressor motor having any of the above-mentioned features. Accordingly, the assembling of the electric compressor can be facilitated, thus enhancing productivity. Moreover, the size of the electric compressor can be reduced, thus achieving reduction in costs and enhancement in mountability.

Moreover, in the electric compressor according to the second aspect, the compression mechanism may be coupled to a rotating shaft joined to a rotor of the motor, on the stator coil end side of the motor on which the cluster block is placed.

According to the second aspect, the compression mechanism is coupled to the rotating shaft joined to the rotor of the motor, on the stator coil end side of the motor on which the cluster block is placed. Hence, it is not necessary to secure a space for connecting the motor lead wire to the hermetic terminal on the stator coil end side of the motor, and the motor and the compression mechanism can be coupled closer to each other accordingly. As a result, the size of the electric compressor in the axial direction can be reduced, and the electric compressor can be downsized and compactified.

Moreover, in the electric compressor according to the second aspect, part of a component of the compression mechanism may be arranged on an inner side of the cluster block that is placed in the outer circumferential region of the stator coil end cover or the bobbin of the motor so as to partially protrude toward the compression mechanism, and part of the component may be arranged so as to overlap with part of the cluster block in the axial direction.

According to the second aspect, part of the component of the compression mechanism is arranged on the inner side of the cluster block that is placed in the outer circumferential region of the stator coil end cover or the bobbin of the motor so as to partially protrude toward the compression mechanism, and part of the component is arranged so as to overlap with part of the cluster block in the axial direction. Hence, regardless of the placement of the cluster block on the motor stator, the overlapped arrangement of part of the compression mechanism with part of the cluster block enables close coupling between the compression mechanism and the motor. Accordingly, the size of the electric compressor in the axial direction is reduced, thus achieving the compactification thereof.

Moreover, in the electric compressor according to the second aspect, the inverter may be placed in the inverter accommodating part provided in the outer circumferential region of the motor housing, and the inverter that drives and controls the compressor motor may be incorporated and integrated in the outer circumferential region of the motor housing.

According to the second aspect, the inverter is placed in the inverter accommodating part provided in the outer circumferential region of the motor housing, and the inverter that drives and controls the compressor motor is incorporated and integrated in the outer circumferential region of the motor housing. Hence, the inverter-integrated electric compressor configured by incorporating the inverter in the outer circumferential region of the motor housing can be further downsized and compactified. Accordingly, the mountability of the electric compressor on an air conditioning apparatus or the like can be enhanced, and the commercial value thereof can be made higher.

Advantageous Effects of Invention

According to the compressor motor of the present invention, in the state where the motor in which the cluster block connected to the motor lead wire is placed in the outer circumferential region of the stator coil end cover or the bobbin is inserted and placed at a predetermined position of the motor housing, the hermetic terminal is inserted and connected directly to the terminal connection port of the cluster block from the outer circumferential side of the motor housing through the opening, and the hermetic terminal is fixedly placed on the placement bearing surface of the motor housing, whereby electrical connection from the outside of the motor housing to the motor in the motor housing can be established. Such a configuration eliminates the need to connect the motor lead wire and the hermetic terminal to each other in a small space in the motor housing. Hence, the assembling of the motor can be facilitated, and the length of the motor lead wire can be reduced. Further, the compressor motor does not require: securing a connection space for the motor lead wire on the stator coil end side of the motor; and securing an arrangement space for the cluster block, the motor lead wire, and the like over the entire length of the motor housing, and eventually reduction in size and weight of the housing and the electric compressor can be achieved.

According to the electric compressor of the present invention, the compression mechanism coupled to the compressor motor having any of the above-mentioned features can be driven by means of the compressor motor. Accordingly, the assembling of the electric compressor can be facilitated, thus enhancing productivity. Moreover, the size of the electric compressor can be reduced, thus achieving reduction in costs and enhancement in mountability.

DESCRIPTION OF EMBODIMENTS

Hereinafter, embodiments of the present invention are described with reference to the drawings.

First Embodiment

A first embodiment of the present invention is described below with reference to FIG. 1 to FIG. 8.

Figure 1:
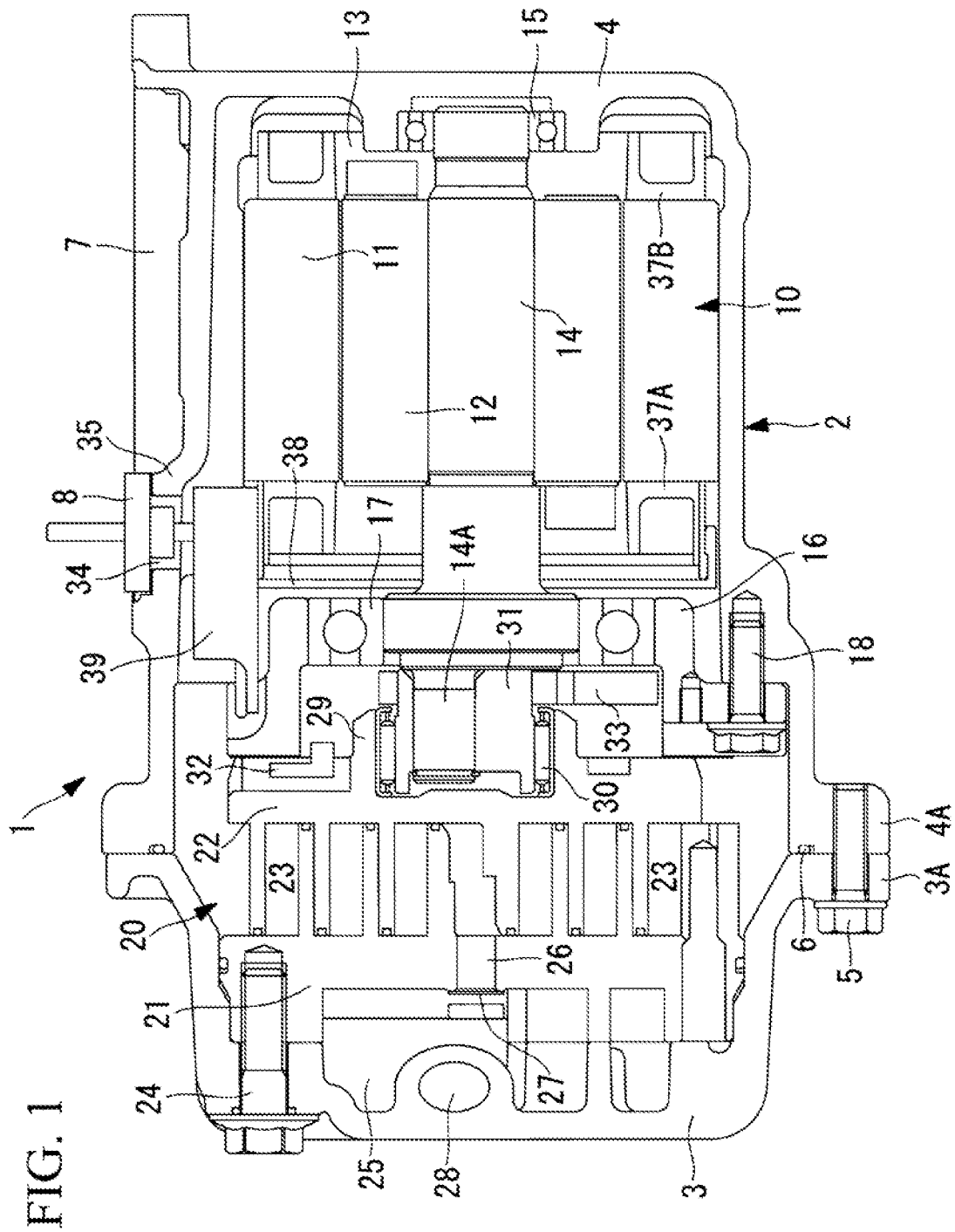
FIG. 1 is a longitudinal sectional view illustrating an electric compressor according to a first embodiment of the present invention, from which an inverter part is omitted.
Figure 2:
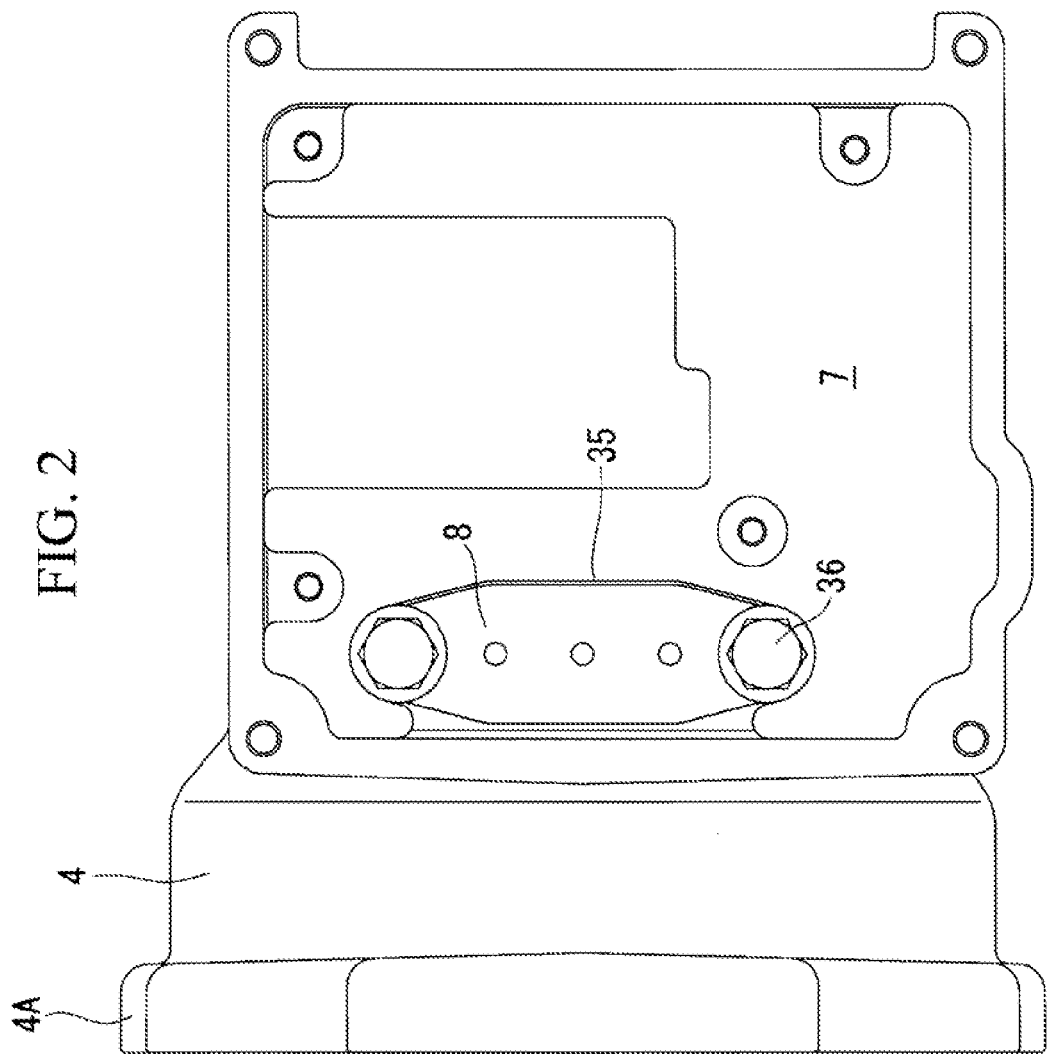
FIG. 2 is a plan view illustrating a compressor motor side of the electric compressor illustrated in FIG. 1.
Figure 3:
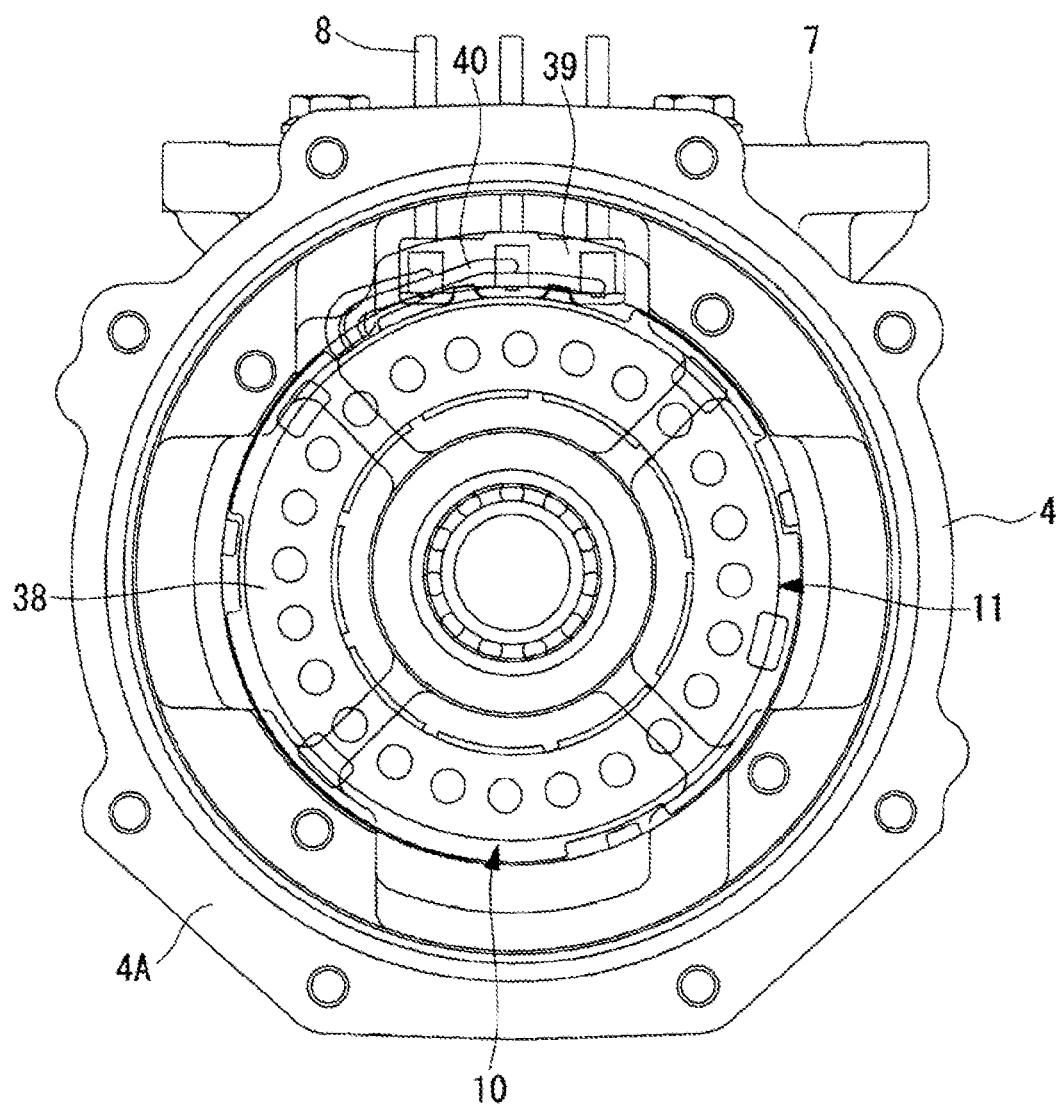
FIG. 3 is a front view illustrating the compressor motor side of the electric compressor illustrated in FIG. 1, which is taken from a compression mechanism side.
Figure 4:
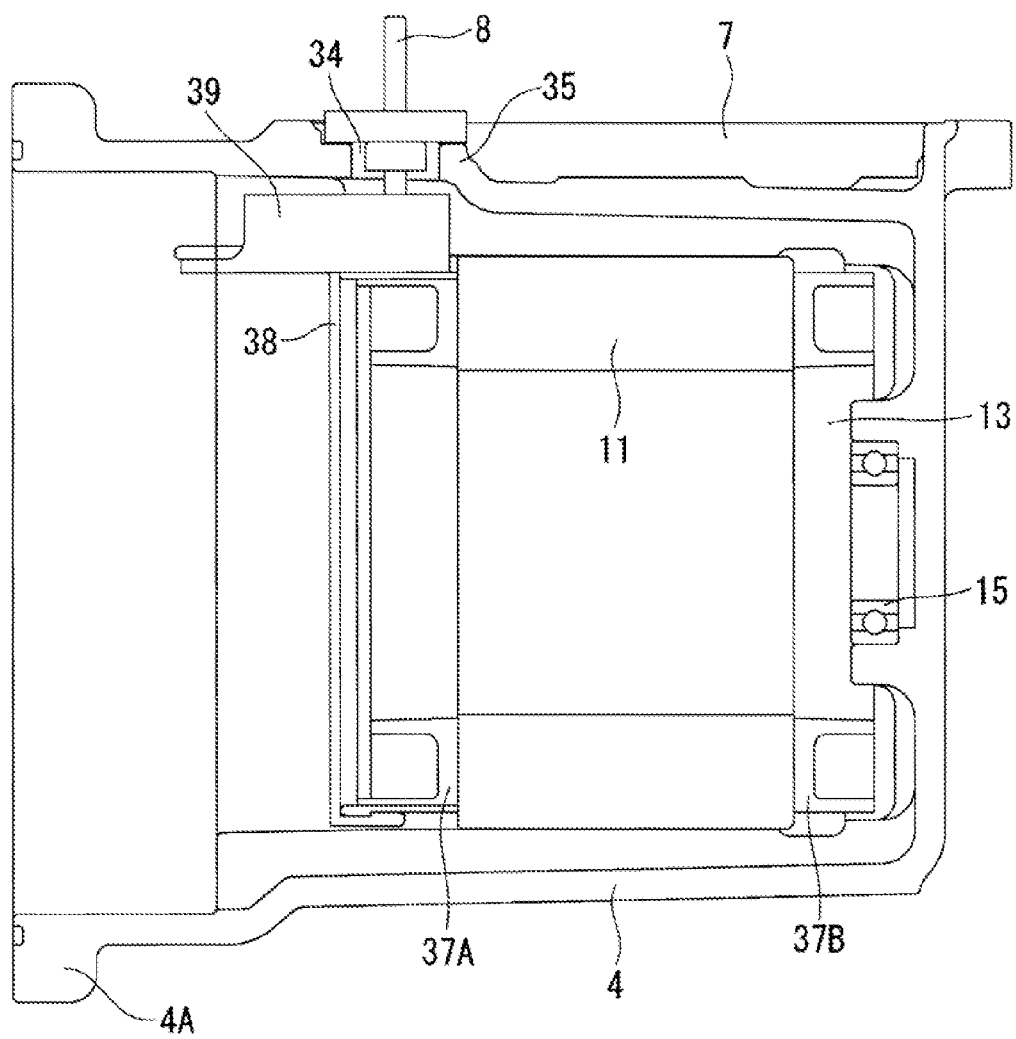
FIG. 4 is a longitudinal sectional view illustrating a stator on the compressor motor side of the electric compressor illustrated in FIG. 1.

FIG. 1 is a longitudinal sectional view illustrating an electric compressor according to the first embodiment of the present invention, from which an inverter part is omitted, FIG. 2 is a plan view illustrating a compressor motor side thereof, FIG. 3 is a front view illustrating the compressor motor side, which is taken from a compression mechanism side, and FIG. 4 is a longitudinal sectional view illustrating the compressor motor side.

In the present embodiment, a scroll-type electric compressor 1 is exemplified as the electric compressor 1. The electric compressor 1 includes a tubular housing 2 that forms an outer frame. The housing 2 includes a bottomed tubular compressor housing 3 and a bottomed tubular motor housing 4 each made of aluminum die-casting, and the compressor housing 3 and the motor housing 4 are integrated with each other by fastening flange parts 3A and 4A that are respectively shaped integrally with the two housings, using a bolt 5 through an O-ring 6.

An inverter accommodating part 7 is integrally provided on the outer circumference of the motor housing 4. An inverter (omitted from the drawings) is incorporated in the inverter accommodating part 7. The inverter converts DC electric power supplied from a power supply unit (omitted from the drawings) into three-phase AC electric power, and applies the three-phase AC electric power to a compressor motor (hereinafter, simply referred to as "motor" in some cases) 10 placed in the motor housing 4, via a hermetic terminal 8. Note that the used inverter may be known one, and detailed description thereof is omitted.

The compressor motor 10 built in the motor housing 4 includes a stator 11 and a rotor 12, and the stator 11 is fixed by press-fitting or the like to the inner circumferential surface of the motor housing 4. Between the stator 11 and the motor housing 4, gas passages (omitted from the drawings) that pass completely therethrough in the axial direction are provided at a plurality of portions in the circumferential direction. Through these gas passages, low-pressure refrigerant gas that is suctioned from a suction port (omitted from the drawings) provided on the rear end side of the motor housing 4 into a space 13 between the bottom surface of the motor housing 4 and the end surface of the electric motor 10 can be circulated to the front side.

A rotating shaft (crankshaft) 14 is integrally joined to the rotor 12. The rear end part of the rotating shaft 14 is rotatably supported by a bearing 15 provided in the bottom surface part of the motor housing 4, and the front end part thereof is rotatably supported by a main bearing 17 provided in a bearing member 16. A crank pin 14A that is eccentric by a predetermined amount with respect to the rotating shaft center is provided in the front end part of the rotating shaft 14. Note that the bearing member 16 is fixedly supported on the opened end side of the motor housing 4 using a bolt 18.

Meanwhile, a scroll compression mechanism 20 is provided in the compressor housing 3. The scroll compression mechanism 20 is a known compression mechanism configured by engaging a pair of a fixed scroll 21 and an orbiting scroll 22 with each other, and a pair of compression chambers 23 formed between the two scrolls 21 and 22 are moved by an orbital motion of the orbiting scroll 22 while reducing a volume thereof from an outer circumferential position toward the center, whereby the scroll compression mechanism 20 compresses the low-pressure refrigerant gas.

The fixed scroll 21 is fixedly placed on the bottom surface side of the compressor housing 3 using a bolt 24, and a discharge chamber 25 is formed between the end plate rear surface thereof and the bottom surface of the compressor housing 3. High-pressure gas is discharged into the discharge chamber 25 from a central compression chamber via a discharge port 26 and a discharge valve 27, the central compression chamber being formed by portions of the pair of compression chambers 23 that join together in the central portion. The high-pressure gas is discharged to the outside through a discharge pipe connected from the discharge chamber 25 to a discharge port 28.

The end plate rear surface of the orbiting scroll 22 is supported by the thrust surface of the bearing member 16. Further, the crank pin 14A of the rotating shaft 14 is coupled to a boss part 29 provided on the end plate rear surface of the orbiting scroll 22 through a needle bearing 30 and a drive bush 31, and the orbiting scroll 22 is driven by the rotation of the rotating shaft 14 so as to orbit around the fixed scroll 21. The orbital motion of the orbiting scroll 22 is inhibited by an Oldham ring 32 interposed between the end plate rear surface thereof and the bearing member 16. Note that a balance weight 33 for adjusting an unbalanced load due to the orbital driving of the orbiting scroll 22 is integrally provided to the drive bush 31.

Moreover, the scroll-type electric compressor 1 adopts the following configuration in order to apply electric power controlled by the inverter accommodated in the inverter accommodating part 7, to the compressor motor 10 via the hermetic terminal 8.

As illustrated in FIG. 2, the hermetic terminal 8 is placed at an axial position corresponding to a stator coil end of the motor 10 built in the motor housing 4, in the inverter accommodating part 7 provided in the motor housing 4. The hermetic terminal 8 is inserted into an opening 34 that passes completely through the motor housing 4, and is fastened and fixed to a placement bearing surface 35 provided around the opening 34, using bolts 36.

Figure 5:
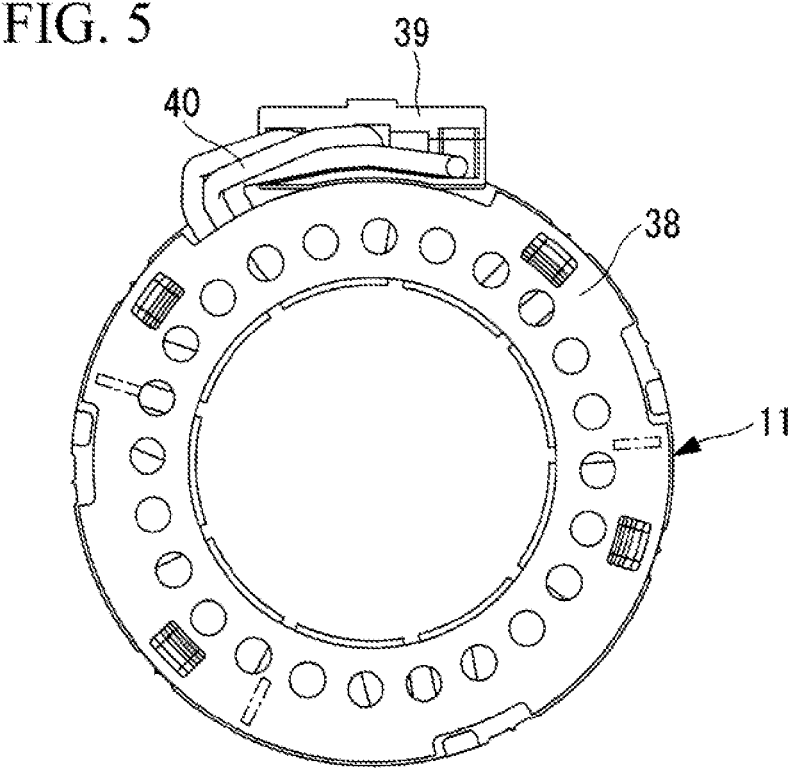
FIG. 5 is a front view illustrating the stator alone of the compressor motor to be applied to the electric compressor illustrated in FIG. 1.
Figure 6:
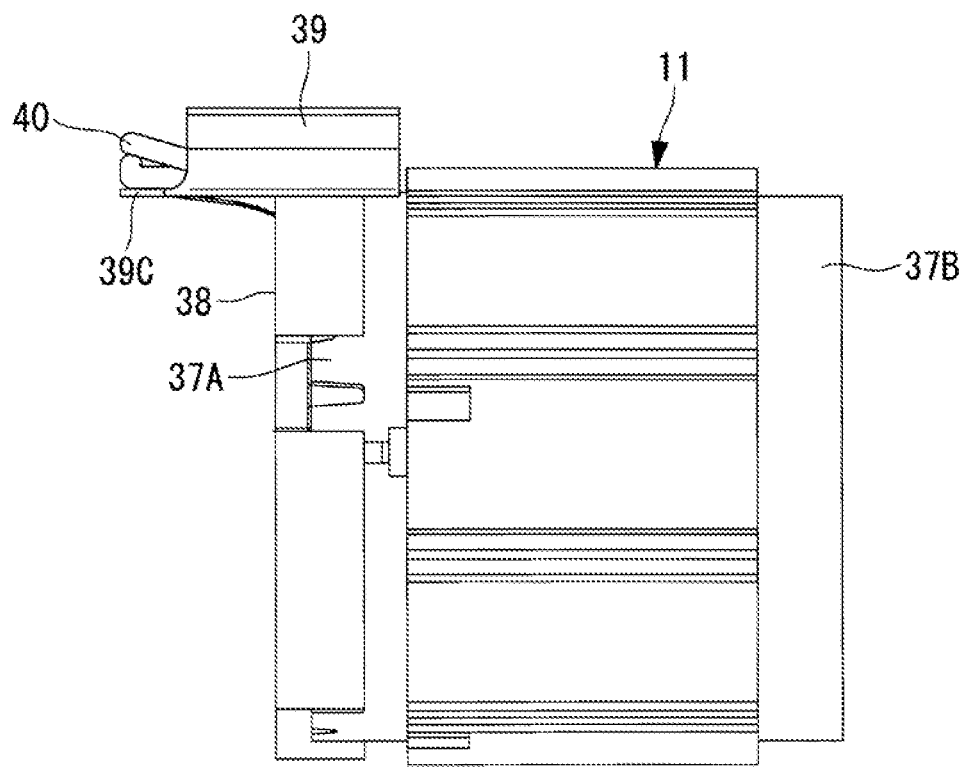
FIG. 6 is a side view illustrating the stator of the compressor motor illustrated in FIG. 5.

Meanwhile, as illustrated in FIG. 4 to FIG. 6, a pair of resin bobbins 37A and 37B for winding a stator winding wire around each end part (coil end) of the stator 11 are provided on the compressor motor 10 side built in the motor housing 4, and a stator coil end cover 38 is fitted to the bobbin 37A on the scroll compression mechanism 20 side. A cluster block 39 is placed in a portion on the outer circumference of the stator coil end cover 38, the portion facing the opening 34.

As illustrated in FIG. 4, the cluster block 39 is placed such that the front end part (the end part on the scroll compression mechanism 20 side) thereof protrudes and overhangs from the end surface of the stator coil end cover 38 toward the scroll compression mechanism 20, and part of the bearing member 16 that is a component of the scroll compression mechanism 20 is arranged on the inner side of the cluster block 39. As illustrated in FIG. 1, part of the cluster block 39 and part of the bearing member 16 are arranged so as to overlap with each other in the axial direction.

Figure 7:
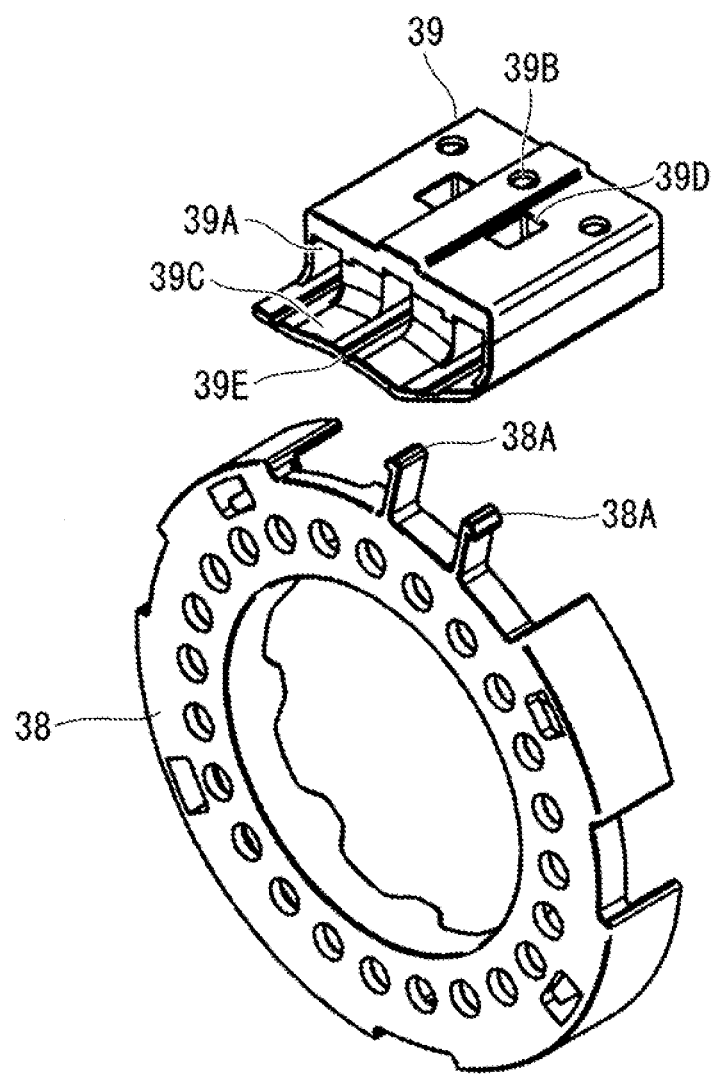
FIG. 7 is an exploded perspective view illustrating a stator coil end cover of the compressor motor illustrated in FIG. 5 and a cluster block to be attached to the stator coil end cover.
Figure 8A:
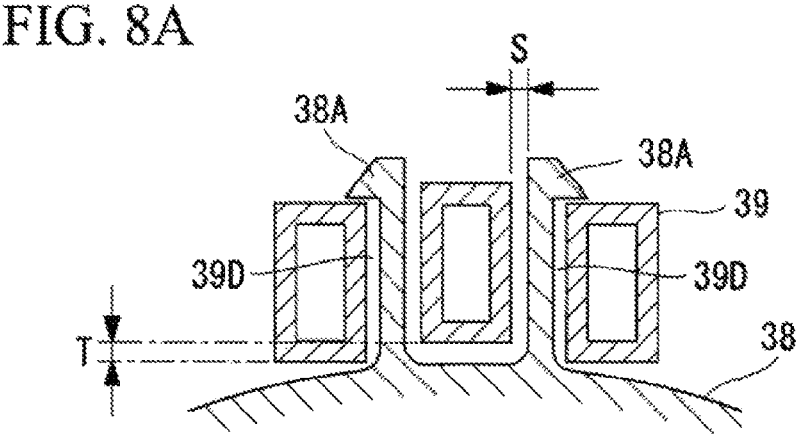
FIG. 8A is an enlarged sectional view illustrating an attachment portion of the stator coil end cover and the cluster block illustrated in FIG. 7.
Figure 8B:
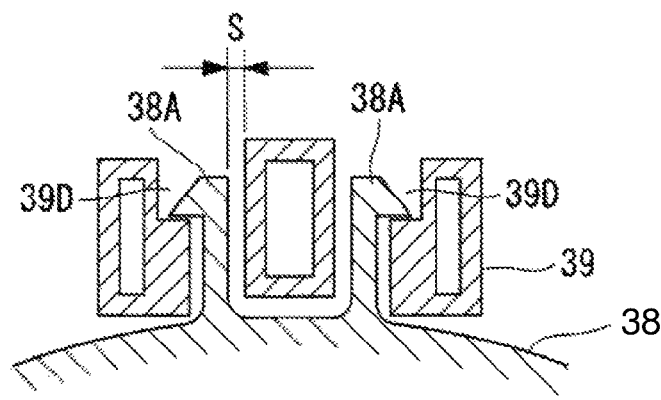
FIG. 8B is an enlarged sectional view illustrating a modified example of the attachment portion of the stator coil end cover and the cluster block illustrated in FIG. 7.
Figure 8C:
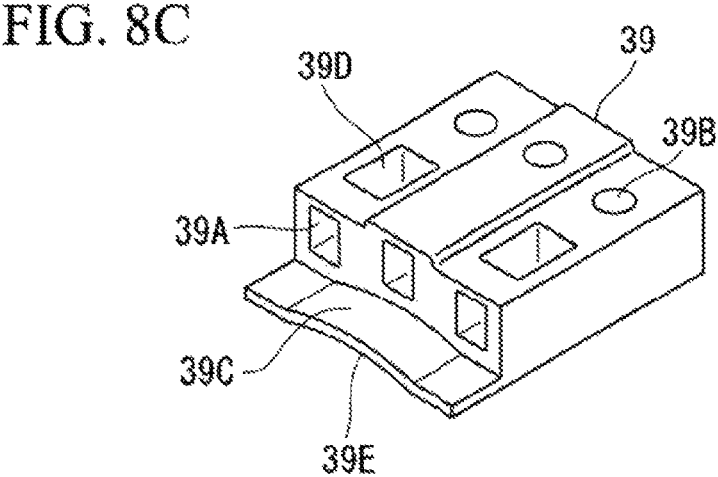
FIG. 8C is a perspective view illustrating the cluster block illustrated in FIG. 7.

Further, as illustrated in FIG. 7 and FIG. 8, the cluster block 39 has a block body including UVW terminals integrally provided in a resin case. Three lead wire connection parts 39A are provided in the front end part of the cluster block 39, and three terminal connection ports 39B are provided on the outer circumference of the rear end part thereof. Three U-, V-, and W-phase motor lead wires 40 taken out from the stator coil end of the motor 10 are respectively connected to the lead wire connection parts 39A, and terminals of the hermetic terminal 8 are respectively connected to the terminal connection ports 39B. A guide part 39C that guides the motor lead wires 40 and protrudes toward the front side is integrally provided in the front end part of the cluster block 39.

Moreover, the cluster block 39 has a stepped structure in which a terminal in the central portion of the UVW terminals provided in the resin case is arranged higher by an amount T (see FIG. 8A) than terminals on both sides thereof, and hence the outer shape of the cluster block 39 similarly has a stepped structure in which the central terminal part is arranged higher than the terminal parts on both the sides. Consequently, an inner circumferential surface 39E of the cluster block 39 in contact with the outer circumferences of the stator coil end cover 38 and the bobbin 37A has a shape along the outer circumferential surfaces of the stator coil end cover 38 and the bobbin 37A, that is, a curved shape as a whole.

The stator coil end cover 38 is an integrally shaped product made of a resin, and is placed so as to be fitted to the outer circumference of the bobbin 37A. As illustrated in FIG. 7, two nail parts 38A that protrude in the radial direction with a predetermined interval therebetween are integrally shaped so as to correspond to a placement position of the cluster block 39 on the outer circumference of the stator coil end cover 38. The nail parts 38A are respectively fitted to two attachment holes 39D provided in the central portion of the cluster block 39, whereby the cluster block 39 is locked.

As illustrated in FIG. 8, the nail parts 38A and the attachment holes 39D are fitted to each other with a slight gap S in the circumferential direction and/or the axial direction, and the slight gap S enables slight displacement of the cluster block 39 in the circumferential direction and/or the axial direction with respect to the stator coil end cover 38. In this way, the three terminals of the hermetic terminal 8 can be inserted and connected from the outside of the motor housing 4 directly to the terminal connection ports 39B on the outer circumferential surface of the cluster block 39 that is locked with the outer circumferential region of the stator coil end cover 38 so as to be slightly displaceable in the circumferential direction and/or the axial direction.

For the nail parts 38A and the attachment holes 39D, in the example illustrated in FIG. 8A, the leading ends of the nail parts 38A pass completely through the attachment holes 39D, protrude from the outer circumferential surface of the cluster block 39, and are locked with the outer circumferential surface thereof. Alternatively, as illustrated in FIG. 8B, the attachment holes 39D of the cluster block 39 may be configured as such stepped holes that allow the leading ends of the nail parts 38A to be housed in the attachment holes 39D. In this case, the nail parts 38A can be housed inside of the cluster block 39, and can avoid protruding from the outer circumferential surface thereof.

The scroll-type electric compressor 1 configured as described above operates in the following manner.

Electric power is applied to the compressor motor 10 by means of the inverter placed in the inverter accommodating part 7, so that the motor 10 is rotationally driven. At this time, low-pressure refrigerant gas is suctioned into the space 13 via the suction port provided in the motor housing 4. The low-pressure gas passes through the gas passages between the stator 11 and the motor housing 4, and cools the inverter in the inverter accommodating part 7 with the intermediation of the wall surface of the motor housing 4. After that, the low-pressure gas is circulated to the space on the bearing member 16 side, and is suctioned therefrom into the pair of compression chambers 23 of the scroll compression mechanism 20 provided on the compressor housing 3 side.

The low-pressure gas that is suctioned into the pair of compression chambers 23 is compressed by the compression chambers 23 that are moved by the orbital motion of the orbiting scroll 22 while reducing the volume thereof toward the center. Then, the compression chambers 23 join together in the central portion, and the central compression chamber thus formed is communicated with the discharge port 26 provided in the central portion of the fixed scroll 21, whereby compressed high-pressure gas pushes open the discharge valve 27 to be discharged into the discharge chamber 25. The high-pressure gas is sent to a refrigeration cycle through the discharge port 28. After circulating in the refrigeration cycle, the high-pressure gas is suctioned again into the scroll compressor 1 from the suction port.

In the mean time, DC electric power that is supplied from an external power supply to the inverter incorporated in the inverter accommodating part 7 is converted by the inverter into three-phase AC electric power having a frequency that is designated by an upper-level control apparatus to the inverter, and the three-phase AC electric power is applied from the UVW terminals of the inverter to the stator 11 of the motor 10 via the hermetic terminal 8, the cluster block 39 to which the hermetic terminal 8 is connected, and the motor lead wires 40. As a result, the motor 10 is rotationally driven at a predetermined rotating speed.

Further, the motor 10 and an electric system from the inverter to the motor 10 are assembled in the following manner.

The motor 10 is assembled in the state as illustrated in FIG. 5 and FIG. 6 where the cluster block 39 to which the motor lead wires 40 are connected is attached to the outer circumferential region of the stator coil end cover 38 provided in the end part on the compression mechanism 20 side of the stator 11. As illustrated in FIG. 4, the stator 11 is inserted and placed by press-fitting or the like into the motor housing 4. At this time, the stator 11 is placed such that the cluster block 39 attached to the outer circumference thereof is positioned so as to face the opening 34 of the motor housing 4.

The hermetic terminal 8 is inserted into the cluster block 39 that is inserted and placed into the motor housing 4 together with the stator 11 as described above, from the outside of the motor housing 4 through the opening 34, and the three terminals of the hermetic terminal 8 are respectively inserted into the terminal connection ports 39B of the cluster block 39, whereby the hermetic terminal 8 and the motor lead wires 40 can be electrically connected to each other via the cluster block 39. The hermetic terminal 8 is fastened and fixed to the placement bearing surface 35 using the bolts 36 after its connection to the cluster block 39.

Meanwhile, the inverter is attached in a modularized state into the inverter accommodating part 7 at an appropriate timing, and the UVW terminals of the inverter and the hermetic terminal 8 are joined to each other by welding or the like, whereby electrical connection from the inverter to the motor 10 is established. Note that the rotor 12 and the rotating shaft 14 of the motor 10, the bearing member 16, the scroll compression mechanism 20, the compressor housing 3, and the like are sequentially assembled in predetermined order, and are integrated with the motor housing 4, so that the scroll-type electric compressor 1 is assembled.

Now, the present embodiment produces the following operations and effects.

The cluster block 39 that is connected to the stator coil end of the motor 10 via the motor lead wires 40 is placed in the outer circumferential region of the stator coil end cover 38 of the compressor motor 10 such that the terminal connection ports 39B thereof face the outer circumferential side, and the hermetic terminal 8 is inserted and placed into the opening 34 and the placement bearing surface 35 provided in the outer circumferential region of the motor housing 4 that faces the cluster block 39, whereby the terminals of the hermetic terminal 8 can be respectively inserted and connected directly to the terminal connection ports 39B of the cluster block 39.

Accordingly, in the state where the motor 10 in which the cluster block 39 connected to the motor lead wires 40 is placed in the outer circumferential region of the stator coil end cover 38 is inserted and placed at a predetermined position of the motor housing 4, the terminals of the hermetic terminal 8 are respectively inserted and connected directly to the terminal connection ports 39B of the cluster block 39 from the outer circumferential side of the motor housing 4 through the opening 34, and the hermetic terminal 8 is fixedly placed on the placement bearing surface 35 of the motor housing 4, whereby electrical connection from the outside of the motor housing 4 to the motor 10 in the motor housing 4 can be established.

Such a configuration eliminates the need to connect the motor lead wires 40 and the hermetic terminal 8 to each other in a small space in the motor housing 4. Hence, the assembling of the motor 10 can be facilitated, and the length of the motor lead wires 40 can be reduced. Further, the compressor motor does not require: securing a connection space for the motor lead wires 40 on the stator coil end side of the motor 10; and securing an arrangement space for the cluster block 39, the motor lead wires 40, and the like over the entire length of the motor housing 4, and eventually reduction in size and weight of the housing 2 and the electric compressor 1 can be achieved.

Further, the cluster block 39 is placed so as to be slightly displaceable in the circumferential direction and/or the axial direction with respect to the stator coil end cover 38. Hence, such slight displacement of the cluster block 39 can absorb a tolerance at the time of the attachment of the hermetic terminal 8. Accordingly, the hermetic terminal 8 can be easily inserted and connected to the cluster block 39 from the outside of the motor housing 4, and the assembling of the motor 10 can be further facilitated.

Further, the cluster block 39 is slightly displaceably locked by respectively fitting the plurality of nail parts 38A erected from the outer circumferential region of the stator coil end cover 38, to the attachment holes 39D with the slight gap S in the circumferential direction and/or the axial direction. Hence, the cluster block 39 is fitted to the plurality of nail parts 38A erected from the stator coil end cover 38, through the attachment holes 39D with the gap S, whereby the cluster block 39 can be easily slightly displaceably locked. Accordingly, the attachment of the cluster block 39 to the motor 10 and the assembling of the motor 10 can be facilitated.

Further, the cluster block 39 includes the guide part 39C that is integrally provided thereto and guides the motor lead wires 40. Hence, the motor lead wires 40 can be connected to the cluster block 39 by means of the guide part 39C integrally provided to the cluster block 39, and this can suppress protrusion of the motor lead wires 40 and contact thereof with other components. Accordingly, troubles caused by such protrusion of the motor lead wires 40 and contact thereof with the other components can be prevented, and the reliability of the compressor motor 10 can be enhanced.

Further, the cluster block 39 has the inner circumferential surface 39E in contact with the outer circumferential regions of the stator coil end cover 38 and the bobbin 37A, the inner circumferential surface 39E having a curved shape along the outer circumferential surfaces of the stator coil end cover 38 and the bobbin 37A. Hence, the inner circumferential surface 39E of the cluster block 39 is placed along the outer circumferential surfaces of the stator coil end cover 38 and the bobbin 37A, whereby the cluster block 39 can be stably placed in the outer circumferential regions of the stator coil end cover 38 and the bobbin 37A. Accordingly, the insertion and connection of the hermetic terminal 8 to the cluster block 39 can be further facilitated.

In particular, the UVW terminals of the cluster block 39 have the stepped structure in which the terminal in the central portion is arranged higher by the amount T, and hence the inner circumferential surface of the cluster block 39 can be stably placed along the outer circumferential surface of the stator coil end cover 38 or the bobbin 37A. Accordingly, the insertion and connection of the hermetic terminal 8 to the cluster block 38 can be facilitated. Further, the outer circumferential surface of the cluster block 39 also has a stepped shape along the inner circumferential surface of the motor housing 4, and hence the diameter of the motor housing 4 can be reduced, thus achieving reduction in size thereof.

Moreover, the motor housing 4 includes the inverter accommodating part 7 that is provided in the outer circumferential region thereof corresponding to the position at which the hermetic terminal 8 is placed, and electric power controlled by the inverter placed therein is applied to the compressor motor 10 via the hermetic terminal 8. Hence, the UVW terminals of the inverter provided in the inverter accommodating part 7 and the hermetic terminal 8 are electrically connected to each other, and the electric power controlled by the inverter incorporated in the motor housing 4 is applied to the motor 10 via the hermetic terminal 8, whereby the motor 10 can be driven. Accordingly, the connection between the motor 10 provided inside of the motor housing 4 and the inverter provided outside thereof can be simplified and facilitated, and the assembling of the compressor motor 10 for inverter driving can be facilitated.

Further, the compressor housing 3 having the scroll compression mechanism 20 built therein is integrally joined to the motor housing 4 having the compressor motor 10 built therein, whereby the scroll compression mechanism 20 can be driven by the compressor motor 10. Hence, the assembling of the electric compressor 1 itself can be facilitated, thus enhancing productivity. Moreover, the size of the electric compressor 1 can be reduced, thus achieving reduction in costs and enhancement in mountability. In particular, it is not necessary to secure a space for connecting the motor lead wires 40 to the hermetic terminal 8 on the stator coil end side of the motor 10 to which the compression mechanism 20 is joined, the motor 20 and the compression mechanism 10 can be placed closer to each other accordingly, the size of the electric compressor 1 in the axial direction can be reduced, and the electric compressor 1 can be downsized and compactified.

Further, part of the bearing member 16 that is a component of the scroll compression mechanism 20 is arranged on the inner side of the cluster block 39 that is placed in the outer circumferential region of the stator coil end cover 38 of the motor 10 so as to partially protrude and overhang toward the compression mechanism 20, and part of the bearing member 16 is arranged so as to overlap with part of the cluster block 39 in the axial direction. Hence, regardless of the placement of the cluster block 39 on the motor stator 11, the overlapped arrangement of part of the bearing member 16 with part of the cluster block 39 enables close coupling between the scroll compression mechanism 20 and the motor 10. Accordingly, the size of the electric compressor 1 in the axial direction is reduced, thus achieving the compactification thereof.

Moreover, the inverter is incorporated and integrated in the inverter accommodating part 7 provided in the outer circumferential region of the motor housing 4, and hence the inverter-integrated electric compressor 1 configured by incorporating the inverter in the outer circumferential region of the motor housing 4 can be further downsized and compactified. Accordingly, the mountability of the electric compressor 1 on an air conditioning apparatus or the like can be enhanced, and the commercial value thereof can be made higher.

Second Embodiment

Next, a second embodiment of the present invention is described.

The present embodiment is different from the first embodiment described above in that the cluster block 39 is placed in the bobbin 37A at the coil end of the stator 11. The present embodiment is the same as the first embodiment in the other features, and hence description thereof is omitted.

That is, in the present embodiment, the cluster block 39 is placed in the outer circumferential region of the bobbin 37A on the compression mechanism 20 side, of the pair of bobbins 37A and 37B provided at the respective coil ends of the stator 11 of the motor 10, according to a placement structure similar to that of the first embodiment or by sandwiching the cluster block 39 between the bobbin 37A and the stator coil end cover 38.

The bobbin 37A is made of an electrically insulating resin material as described above, and integrally shaping nail parts or the like in the bobbin 37A also enables locking therewith of the cluster block 39, whereby the cluster block 39 can be placed so as to be slightly displaceable in the circumferential direction and/or the axial direction. Further, the axial position of the bobbin 37A is coincide with that of the stator coil end cover 38, and hence the cluster block 39 can be placed at a position at which the cluster block 39 faces the hermetic terminal 8.

Accordingly, the present embodiment can also produce operations and effects similar to those of the first embodiment, and can be similarly applied to the compressor motor 10 not including the stator coil end cover 38.

Note that the present invention is not limited to the inventions according to the above-mentioned embodiments, and can be modified as appropriate within the range not departing from the gist thereof. For example, although the scroll-type electric compressor 1 is exemplified in the above-mentioned embodiments, it goes without saying that the type of the compression mechanism 20 is not limited thereto and that the present invention can be similarly applied to compressors of various types. Further, although the housing 2 including the motor housing 4 and the compressor housing 3 that are joined to be integrated with each other is exemplified above, various modifications are possible. For example, the two housings may be integrated with each other, and the end parts thereof may be sealed with a cover.

REFERENCE SIGNS LIST 1 electric compressor
2 housing
3 compressor housing
4 motor housing
7 inverter accommodating part
8 hermetic terminal
10 compressor motor (motor)
11 stator
12 rotor
14 rotating shaft
20 scroll compression mechanism (compression mechanism)
34 opening
35 placement bearing surface
37A, 37B bobbin
38 stator coil end cover
38A nail part
39 cluster block
39A lead wire connection part
39B terminal connection port
39C guide part
39D attachment hole
39E inner circumferential surface
40 motor lead wire
S gap

The invention claimed is:

1. A compressor motor that is placed in a motor housing and receives
   electric power applied from an outside via a hermetic terminal, wherein
   a cluster block that is connected to a stator coil end of the motor via a motor lead wire is placed in an outer circumferential region of a stator coil end cover or a bobbin of the motor such that a terminal connection port of the cluster block faces a direction orthogonal to a tangential direction of the stator coil end cover,
   an opening and a placement bearing surface for inserting and placing the hermetic terminal are provided in an outer circumferential region of the motor housing, the outer circumferential region facing the cluster block provided on the motor side, and
   the hermetic terminal is inserted and placed from an outer circumferential side of the motor housing to the opening and the placement bearing surface, to be thereby made directly connectable to the terminal connection port of the cluster block, wherein
   the cluster block is slightly displaceably locked by respectively fitting a plurality of nail parts erected from the outer circumferential region of the stator coil end cover or the bobbin, to attachment holes with a slight gap in the circumferential direction and/or the axial direction.

2. The compressor motor according to claim 1, wherein the cluster block is placed so as to be slightly displaceable in a circumferential direction and/or an axial direction with respect to the stator coil end cover or the bobbin.

3. The compressor motor according to claim 1, wherein the cluster block has an inner circumferential surface in contact with the outer circumferential region of the stator coil end cover or the bobbin, the inner circumferential surface having a shape along an outer circumferential surface of the stator coil end cover or the bobbin.

4. The compressor motor according to claim 3, wherein the cluster block has a stepped structure in which a terminal in a central portion of UVW terminals is arranged higher than terminals on both sides thereof, and
   the inner circumferential surface of the cluster block has the shape along the outer circumferential surface of the stator coil end cover or the bobbin.

5. The compressor motor according to claim 1, wherein the cluster block includes a guide part that is integrally provided thereto and guides the motor lead wire.

6. The compressor motor according to claim 1, wherein the motor housing includes an inverter accommodating part that is provided in an outer circumferential region thereof corresponding to a position at which the hermetic terminal is placed, and
   electric power controlled by an inverter placed in the inverter accommodating part is applied to the motor via the hermetic terminal.

7. An electric compressor comprising a compression mechanism and a compressor motor that are respectively built in housings, the compressor motor driving the compression mechanism, wherein
   the compressor housing having the compression mechanism built therein is integrally joined to the motor housing, and
   the compression mechanism is coupled to the compressor motor according to claim 1 that is built in the motor housing, to be thereby made drivable by means of the compressor motor.

8. The electric compressor according to claim 7, wherein the compression mechanism is coupled to a rotating shaft joined to a rotor of the motor, on the stator coil end side of the motor on which the cluster block is placed.

9. The electric compressor according to claim 7, wherein part of a component of the compression mechanism is arranged on an inner side of the cluster block that is placed in the outer circumferential region of the stator coil end cover or the bobbin of the motor so as to partially protrude toward the compression mechanism, and part of the component is arranged so as to overlap with part of the cluster block in the axial direction.

10. The electric compressor according to claim 7, wherein an inverter is placed in an inverter accommodating part provided in the outer circumferential region of the motor housing, and
the inverter that drives and controls the compressor motor is incorporated
and integrated in the outer circumferential region of the motor housing.

* * * * *